(12) United States Patent
Braun et al.

(10) Patent No.: US 12,224,083 B2
(45) Date of Patent: Feb. 11, 2025

(54) UNTWIST TOOL

(71) Applicant: Untwisted Tech LLC, Plymouth, MI (US)

(72) Inventors: Boris Braun, Nantucket, MA (US); Brent Alan Hagood, Canton, MI (US); Deepak Batra, Farmington Hills, MI (US)

(73) Assignee: Untwisted Tech LLC, Plymouth, MI (US)

( * ) Notice: Subject to any disclaimer, the term of this patent is extended or adjusted under 35 U.S.C. 154(b) by 362 days.

(21) Appl. No.: 17/499,304

(22) Filed: Oct. 12, 2021

(65) Prior Publication Data

US 2022/0115169 A1   Apr. 14, 2022

Related U.S. Application Data

(60) Provisional application No. 63/091,233, filed on Oct. 13, 2020.

(51) Int. Cl.
*H01B 13/02*     (2006.01)
*H02G 1/12*      (2006.01)

(52) U.S. Cl.
CPC ....... *H01B 13/0207* (2013.01); *H02G 1/1292* (2013.01)

(58) Field of Classification Search
CPC ... H01B 13/0207; H01B 13/0257; B21F 7/00; H02G 1/1292
USPC ......................................... 140/118, 120, 123
See application file for complete search history.

(56) References Cited

U.S. PATENT DOCUMENTS

| | | | |
|---|---|---|---|
| 400,285 A | 3/1889 | Barraclough | |
| 2,136,388 A | 11/1938 | William | |
| 2,260,443 A | 10/1941 | Downing | |
| 2,540,833 A | 2/1951 | Samuel et al. | |
| 2,719,544 A | 10/1955 | Julius | |
| 3,779,290 A | 12/1973 | Rich et al. | |
| 3,994,320 A * | 11/1976 | Dorsey | H01R 43/033 140/124 |
| 4,074,732 A * | 2/1978 | Wilkens | H01R 43/033 140/123 |
| 4,188,840 A * | 2/1980 | Martschinke | B25B 25/00 140/149 |
| 4,195,401 A * | 4/1980 | Galloup | H01R 43/0335 140/123 |
| 5,379,809 A * | 1/1995 | Waulk | B21F 15/04 140/149 |
| 5,853,033 A | 12/1998 | Kavanagh | |

(Continued)

OTHER PUBLICATIONS

WIPO, International Preliminary Report on Patentability, PCT/US2021/054575, Dec. 13, 2021.

*Primary Examiner* — Edward T Tolan
(74) *Attorney, Agent, or Firm* — Rocklaw PLLC; Michael T. Fluhler

(57) ABSTRACT

An exemplary system may be configured for wire operations. The system may include a wire tool and a drive device operatively connected to the drive device. The wire tool may include a tool body having a rotational axis. The tool body may include an outer shell, a distribution hub, one or more radial walls extending between the distribution hub and the outer shell, and respective channels formed by the outer shell, the distribution hub, and the one or more radial walls.

20 Claims, 15 Drawing Sheets

(56) References Cited

U.S. PATENT DOCUMENTS 7,104,287 B1 * 9/2006 Schmitz ................ H01R 43/28
                                                    140/149
8,555,933 B2 * 10/2013 Houser .................... D07B 7/18
                                                    140/149

* cited by examiner

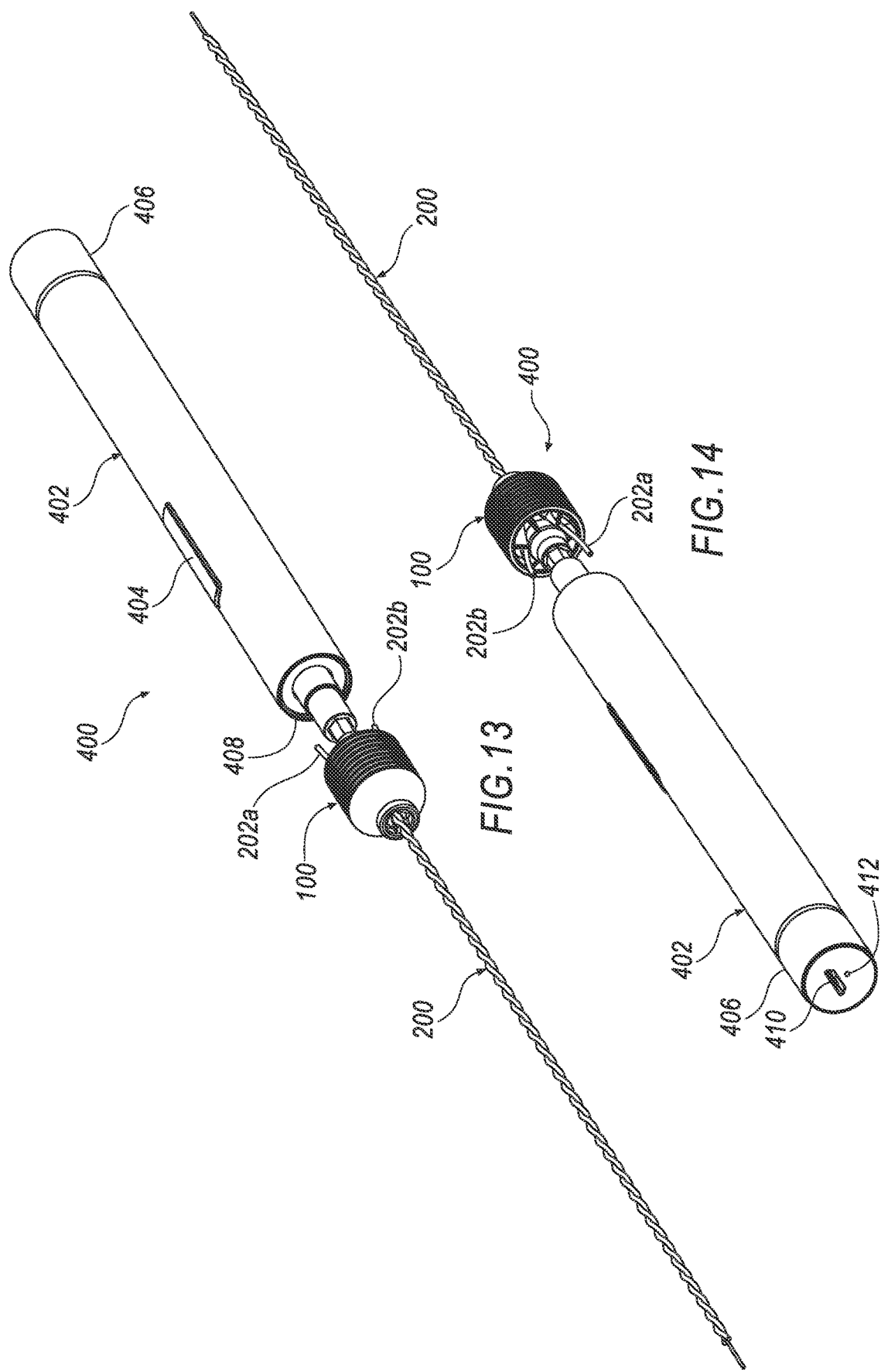

UNTWIST TOOL

CROSS-REFERENCE TO RELATED APPLICATIONS

This application is based on and claims priority to U.S. Provisional Patent Application 63/091,233 filed Oct. 13, 2020, which is hereby incorporated by reference in its entirety.

BACKGROUND

Traditional tools for wiring require technicians to extensively use their fingers. Custom installations for network cables require a crimping or punch-down process. This is a daunting process that requires technicians to use their fingers and tiny tools to perform intricate, repetitive operations. For example, twisting and untwisting of twisted-pair wire requires multiple steps using fingers. And using multiple cables or terminals increases risks for fatigue and injury due to the constant use of fingers. Typical approaches also deteriorate and potentially compromise the integrity of cables.

The present disclosure provides solutions to the shortcomings of traditional tools. There is a need for a systematic approach that improves the output times and volumes for wiring operations while minimizing user fatigue by allowing one-handed operations. There is a need for a wire tool, and associated systems and methods, that minimize or eliminate the use of fingers for wiring operations such as untwisting, separating, and straightening wires, e.g., twisted pair wires. There is a need for a system that includes a tool and a drive device. There is a need for a system that protects a user (e.g., hands and fingers) and improves the speed and efficiency of wiring operations.

BRIEF DESCRIPTION OF THE DRAWINGS

FIG. 13 illustrates an isometric view of an exemplary embodiment of the present disclosure, e.g., an untwist system performing a wiring operation;

FIG. 14 illustrates a back isometric view of FIG. 13;

DETAILED DESCRIPTION

Figure 1:
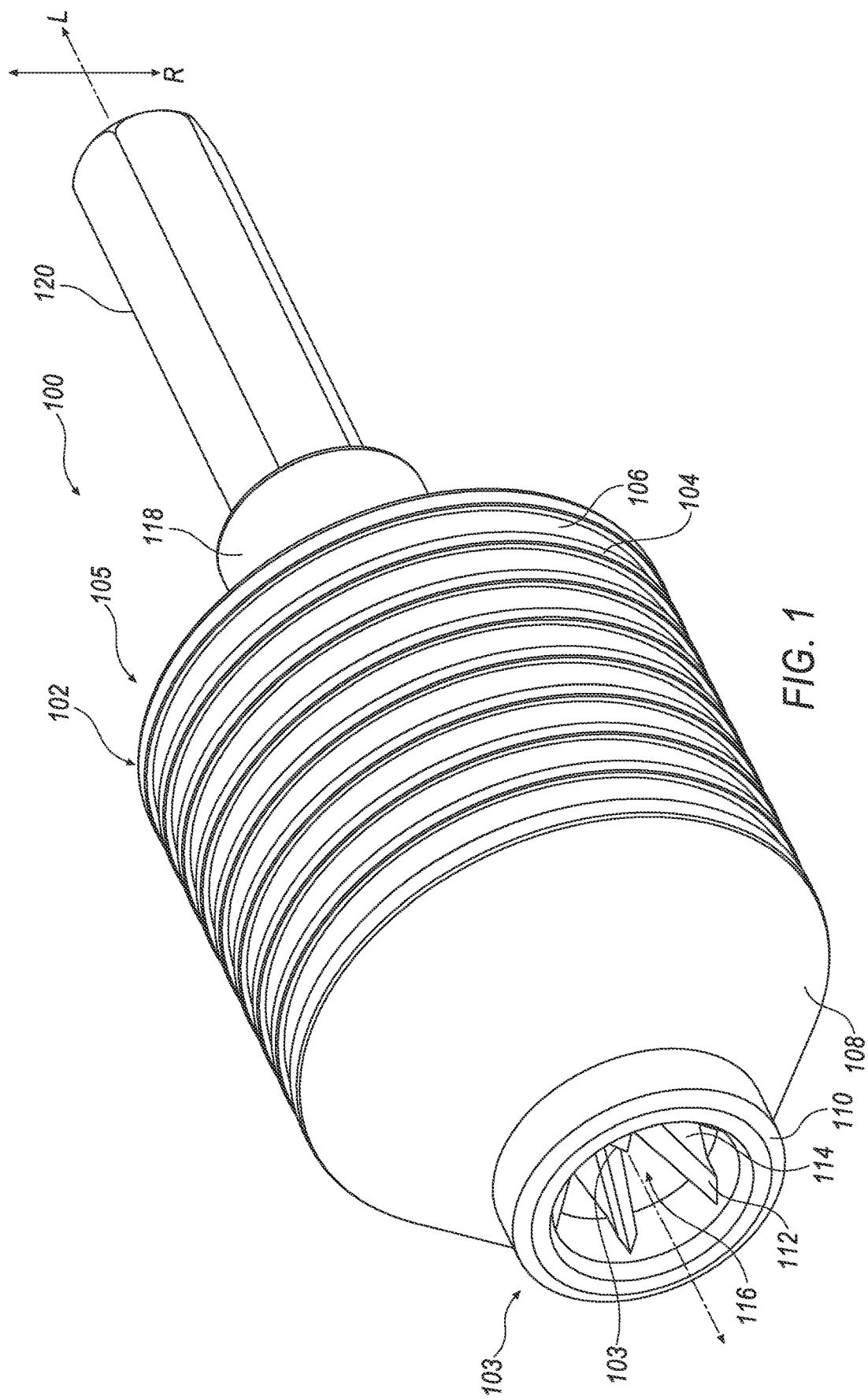
FIG. 1 illustrates an isometric view of an exemplary embodiment of the present disclosure including, e.g., a leading end of a tool including a tool body and a shaft.

Embodiments may be configured to optimize wiring operations. Embodiments may include one or more devices, systems, and methods, any of which may be interchangeably referred to as a "tool" or "untwist tool" for purposes of this disclosure.

The tool may provide a variety of advantages and improvements over existing tools. This may include easier and faster wiring operations such as wire termination. The tool may improve protection for and minimize injury to the user (e.g., hands and fingers). The tool may be configured to improve the speed and efficiency of wiring operations. The tool provides advantages and improvements over typical data, network, audio/video, cable, and telecommunications technologies and associated tools and equipment.

The tool may include a wire tool configured as a wire bit. The tool may be configured to streamline wiring operations on any type of wire and/or connector. The tool may be configured for wiring operations on any type of wire or connector, e.g., for network cables and twisted-pair wire. Exemplary wires and/or connectors may be category 3 through 8 (Cat3 to Cat8), shielded twisted-pair (STP), and/or unshielded twisted-pair UTP. Embodiments may also be configured for RJ 45 (e.g., EZ-RJ 45) connectors.

Embodiments may be configured for any wiring operations such as twisting, untwisting, cutting, decoupling, crimping, or connecting operations or a combination thereof. The tool may include a tool body and a shaft. The tool body may include a socket along the rotational axis of the tool body, e.g., configured to receive the shaft. The shaft and socket may include corresponding male and female connections, e.g., a hex and/or microwire tool. An exemplary connection may include $\frac{5}{32}$" (4 mm) hex-sized.

An exemplary tool may include a tool body and a shaft. The tool body may include an outer shell, a distribution hub, one or more radial walls, a rotational axis, a radial axis, and leading and trailing ends. The radial walls may extend all or any part of the tool body, form respective channels therebetween, receive a wire between the outer shell and distribution hub, and/or split the wire into wire strands along respective channels that expand radially outward to capture and separate each wire strand. The outer shell may include an outer edge (e.g., a rounded tip). The distribution hub may include an inner edge (e.g., pointed, angled, and/or star-structured tip). The tool may be configured to receive and direct the wire at the leading end, separate the wire into respective strands along the distribution hub, and discharge the separated wire strands at the trailing end.

An exemplary system may be configured for powered or mechanically assisted wire operations. The system may include a wire tool and a drive device operatively connected to the drive device. The wire tool may include a tool body having a rotational axis. The tool body may include an outer shell, a distribution hub, one or more radial walls extending between the distribution hub and the outer shell, and respective channels formed by the outer shell, the distribution hub, and one or more radial walls.

Methods are contemplated. A method may include providing a tool body having a rotational axis. The method may include providing the tool body having an outer shell, a distribution hub, one or more radial walls extending between the distribution hub and the outer shell, and respective channels formed by the outer shell, the distribution hub, and one or more radial walls. The method may include providing a shaft configured to be positioned in the tool body and along the rotational axis and receiving a wire between the outer shell and distribution hub to split the wire into the respective channels.

Embodiments may be optimized for ergonomics. An exemplary tool may be configured to minimize finger usage for wiring operations such as untwisting, separating, and straightening wires, e.g., twisted-pair wires and network cables. This may include a system having a tool (e.g., wire tool) and a drive device (e.g., electrically powered and/or mechanically operated), e.g., modular or integral to each other. The drive device may include a motorized, non-motorized, lever-assisted, and/or battery-powered tool, e.g., a screwdriver device, impact driver, drill, similar tools, or a combination thereof.

The tool may be configured to perform multiple operations simultaneously or sequentially, e.g., using one or more applied force such as a rotational, longitudinal, radial, centrifugal, twist, contact, or combination force. As an example, the tool may simultaneously or sequentially provide a longitudinal force to feed the wire into the tool body, a rotational or centrifugal force to untwist and separate the wire along the channels, and a contact force to straighten the wire. The tool may apply a longitudinal force to advance the wire, a rotational and/or centrifugal force to separate the wire, a contact force between the wire and the rounded tip to straighten the wire, and a further rotational force to wrap the wire around the grooves of the outer shell to further straighten the wire.

The tool may be configured for one or more wire straightening operations. The rounded tip of the tool body may apply a contact force to the wire while a longitudinal force (e.g., pull or push) is applied along a longitudinal axis of the wire. The rotational force may be applied while the tool and the wire are pulled in opposite directions, thereby sliding the wire against the outer edge of the tool body to straighten the wire. The tool body may include one or a plurality of grooves (e.g., of any quantity such as six) such that the wire may be positioned around the outer shell and into the grooves, e.g., for further straightening the wire.

Embodiments may include a system having a wire tool, a drive device, or a combination thereof. An exemplary drive device may include a mechanical, motorized, or combination device configured to apply a rotational and/or longitudinal force on the wire tool. The drive device may include any electric, wired, wireless, or battery-powered tool. An exemplary drive device may include a screwdriver, impact driver, drill, or a combination thereof. The drive device may include a control switch (e.g., a button, toggle, slider, or touch panel) for activating and controlling the rotational speed of the wire tool.

A system may include the tool and the drive device, e.g., modular or integral to each other. This may include a mechanical or non-mechanical tool or may be used in combination with adapters. The tool may be used with any socket size (e.g., 5/32, 1/4, 3/8, or 1/2 inch or 4 mm hex) for mechanical or non-mechanical tools. The tool may also be combined with an inset and/or magnetic adaptor, e.g., an inset magnetic adaptor bit. The tool may include or be used in combination with any mechanical or electrical device.

Embodiments may include customizable structures and features. The tool may include grooves of any quantity, shape, length, width, or height. The tool may include 3D printed or injected molded structures. The tool may include any finishes, coatings, and colors. The tool may include any material such as plastic, thermoplastics, polymers, metal, multi jet fusion (MJF), 3D printable, or composite materials. Exemplary materials may include MJF nylon 12, acrylonitrile butadiene styrene (ABS), steel, aluminum, bronze, or a combination thereof.

FIGS. 1-20 illustrate embodiments of the present disclosure. The devices, systems, and methods may take many different forms and include multiple and/or alternate components, structures, arrangements, and steps. While exemplary embodiments are shown, they are not intended to be limiting, and additional or alternative components and/or implementations may be used. Embodiments may be configured for one or more wiring operations such as twisting, untwisting, cutting, decoupling, crimping, or connecting operations or a combination thereof.

FIGS. 1-12 illustrate embodiments of tool 100. Tool 100 may include body 102, outer shell 104, grooves 106, nozzle 108, outer edge 110 (e.g., with a rounded tip), inner edge 112 (e.g., inner edges 112a,b), nose 113 (e.g., with a pointed, angled and/or star-structured tip), radial walls 114, channels 116 (e.g., angled channels), distribution hub 118, shaft 120, and socket 122.

Figure 2:
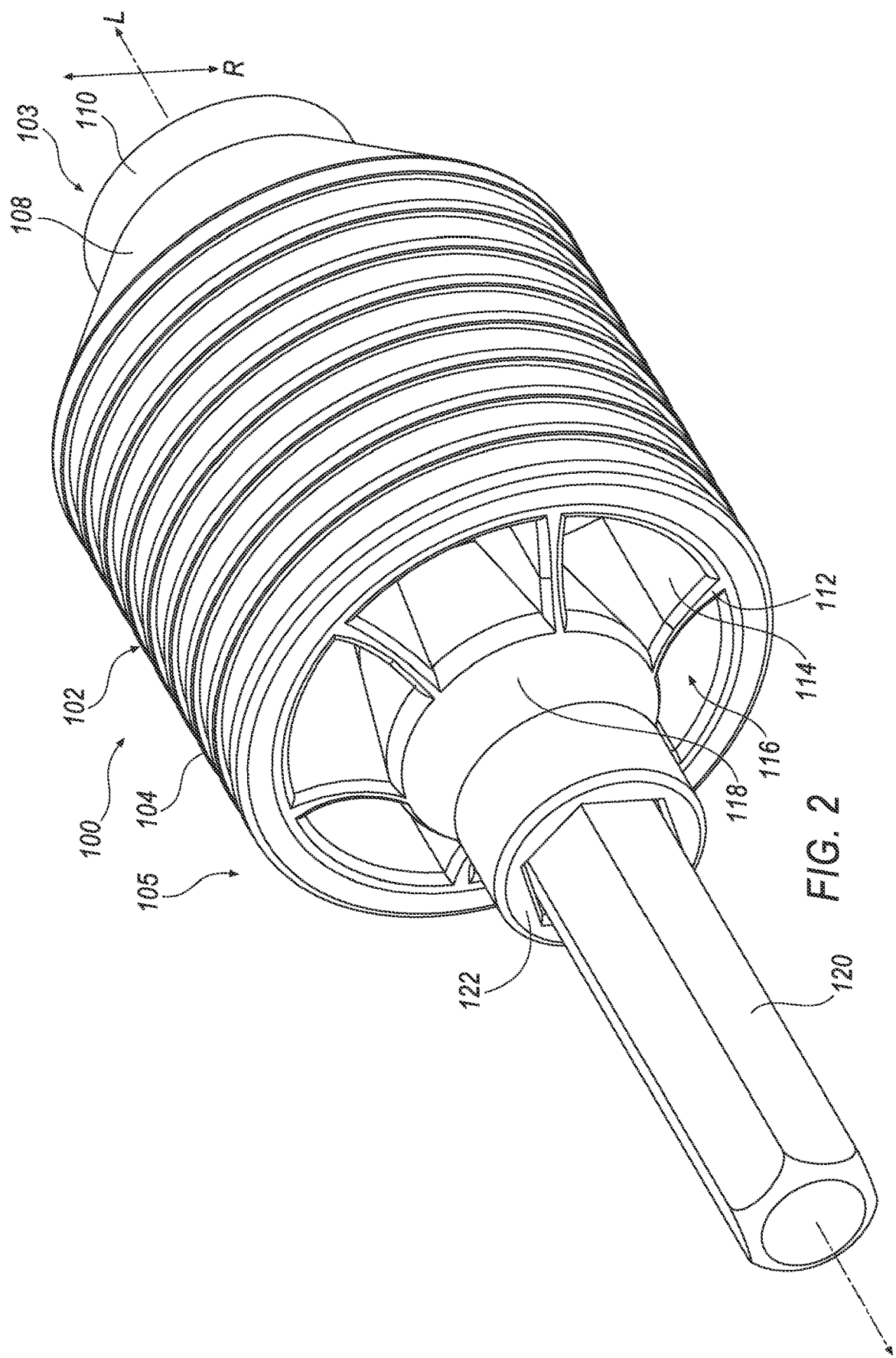
FIG. 2 illustrates a back isometric view of FIG. 1, e.g., a trailing end of the tool.
Figure 3:
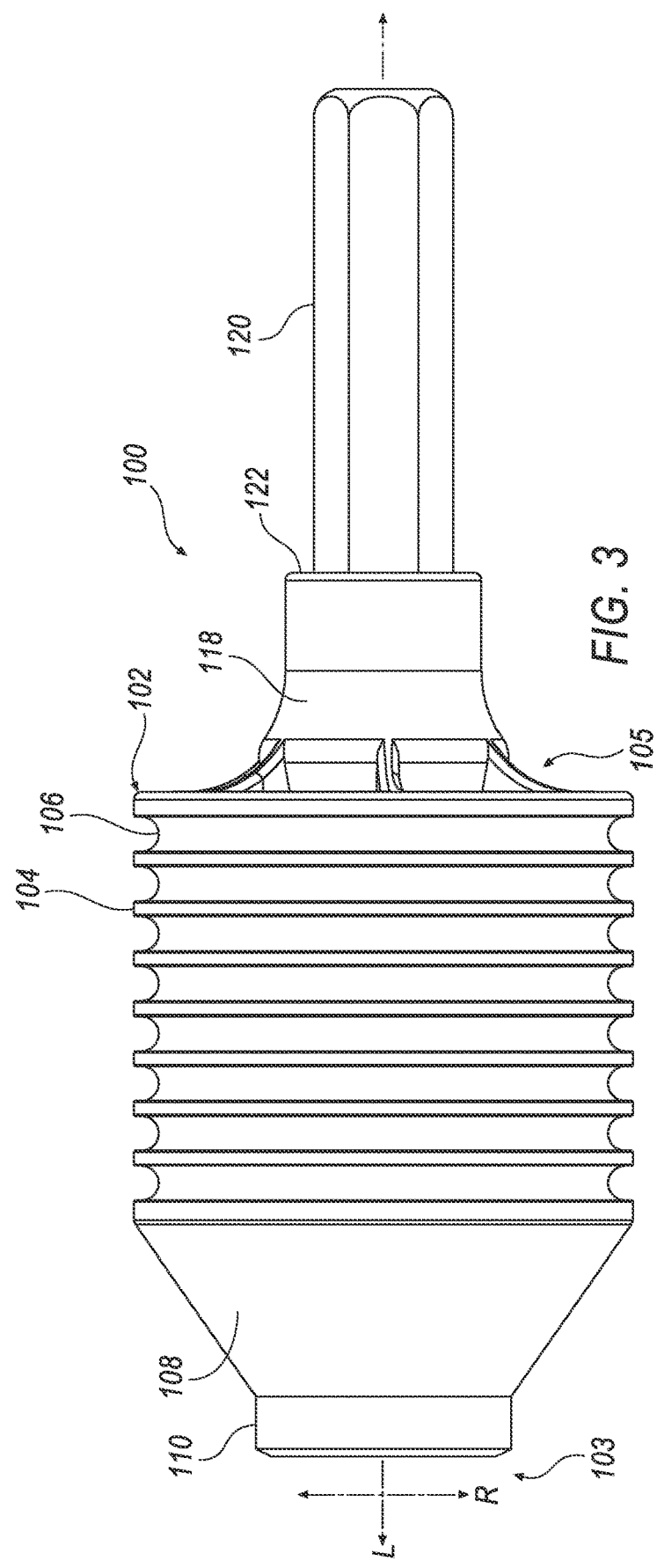
FIG. 3 illustrates a side view of FIG. 1 including, e.g., a leading end for receiving a wire, a tool body for separating the wire into strands, and a trailing end that provides the separated wire strands.
Figure 4:
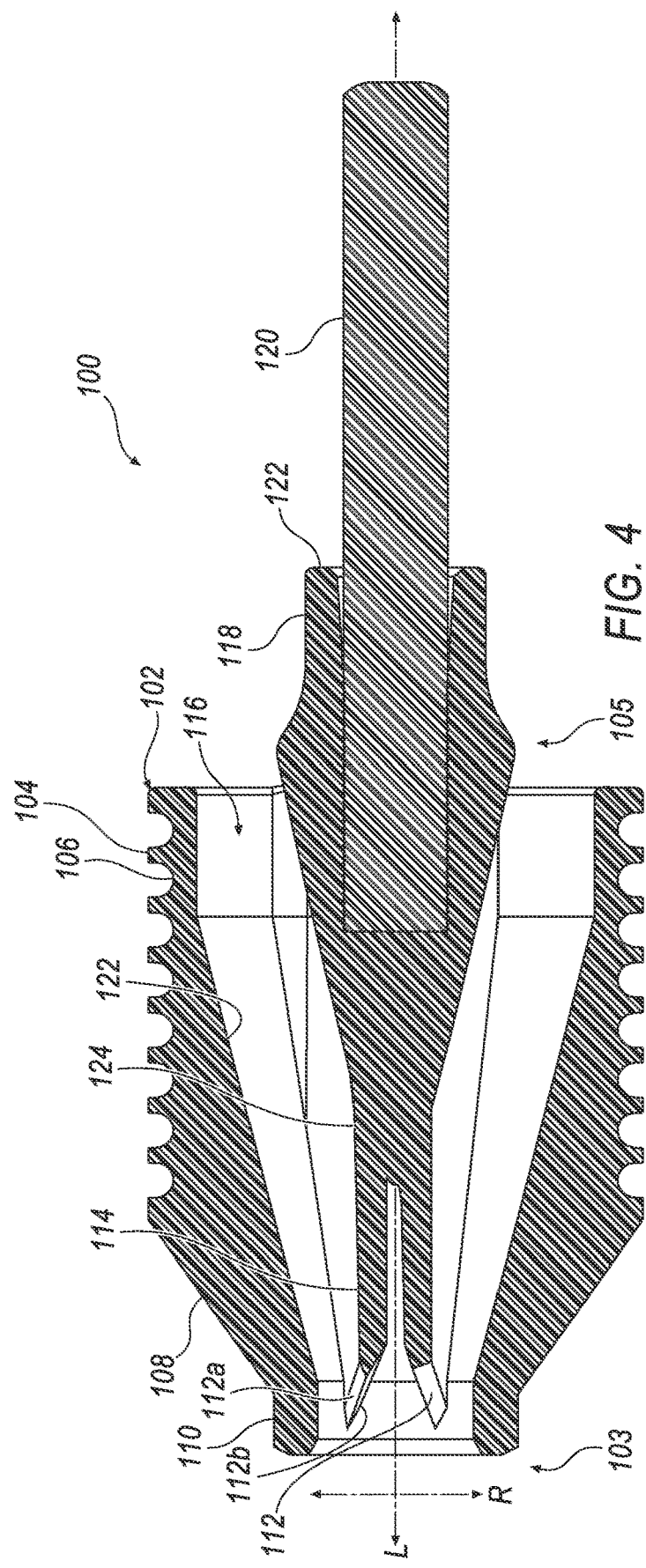
FIG. 4 illustrates a cross-section view of FIG. 3 including, e.g., a tool body having channels formed by an outer wall, an inner wall, and radial walls.
Figure 5:
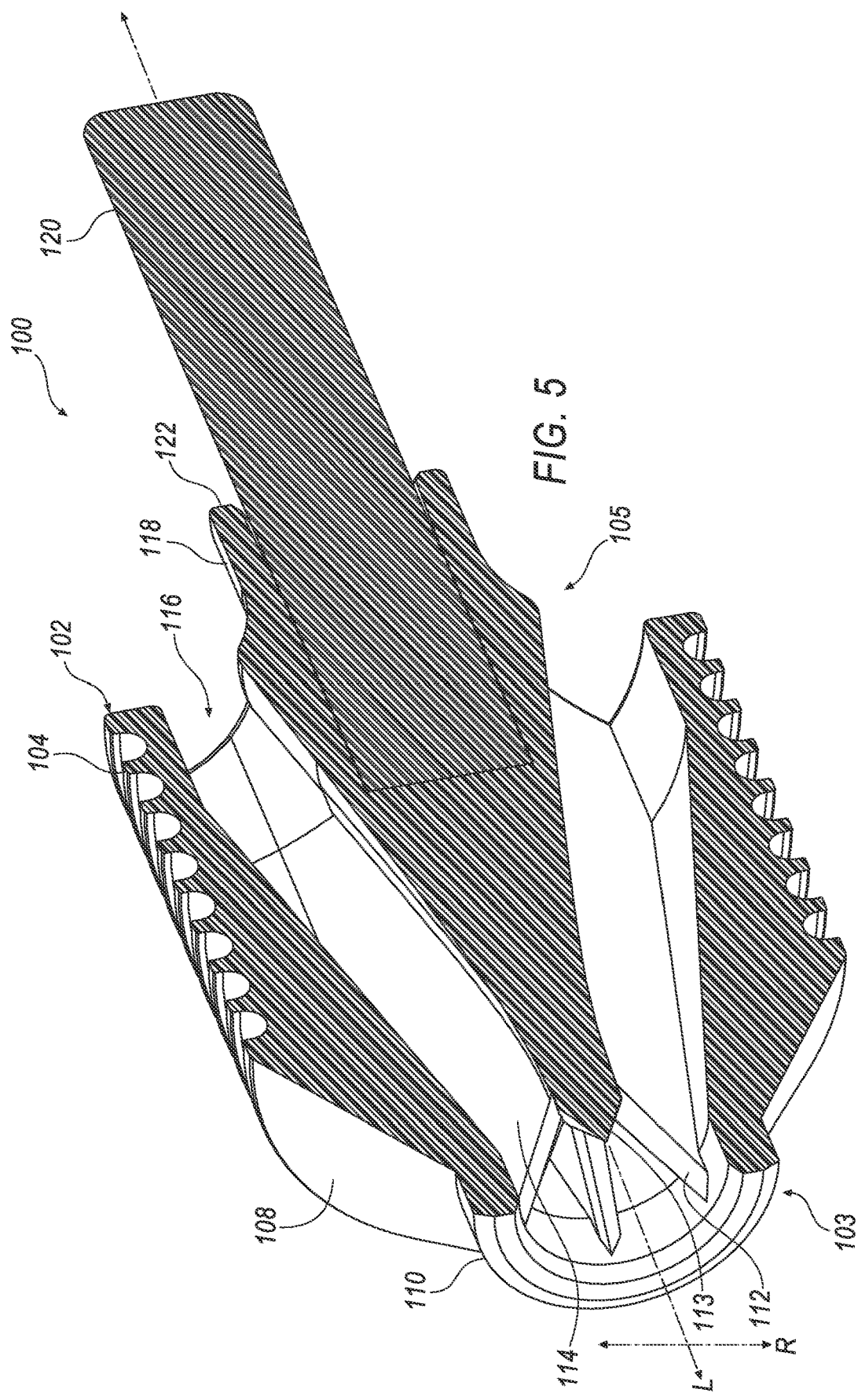
FIG. 5 illustrates a cross-section view of FIG. 1 including, e.g., an outer edge (e.g., with a rounded tip), an inner edge (e.g., with a pointed, angled, and/or star-structured tip), radial walls, and respective channels (e.g., angled channels)
Figure 6:
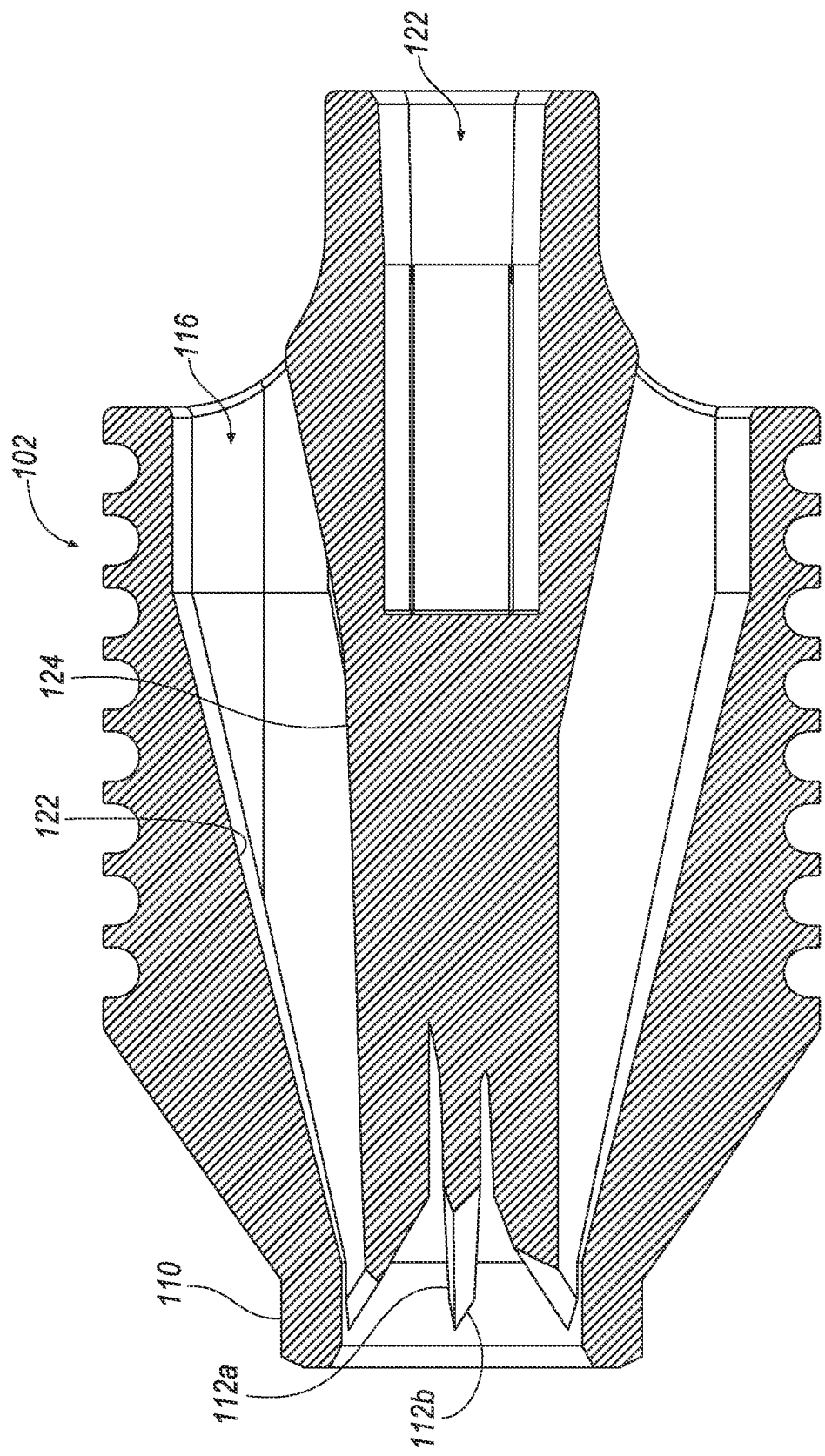
FIG. 6 illustrates a further cross-section view of FIG. 1 including, e.g., a tool body with a socket for receiving a shaft.
Figure 7:
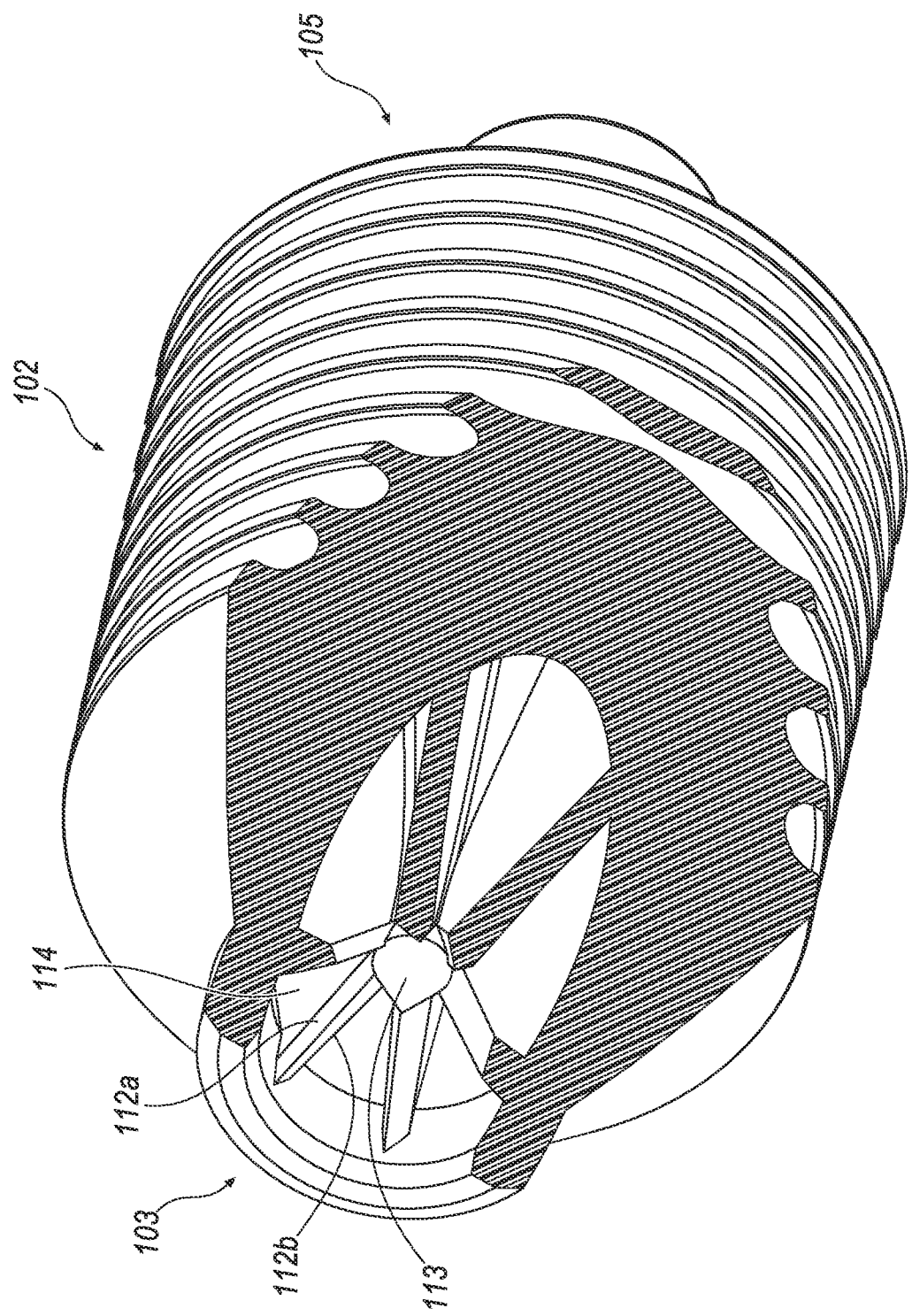
FIG. 7 illustrates another cross-section view including, e.g., an outer edge (e.g., with a rounded tip) and an inner edge (e.g., with a pointed, angled, and/or star-structured tip)

Referring to FIGS. 1, 2, and 3, tool 100 may include body 102 and shaft 120. As shown in FIGS. 4, 5, and 6, the tool body 102 may include socket 122 along the rotational axis of the tool body 102, e.g., configured to receive shaft 120. Shaft 120 and socket 122 may be configured as corresponding male and female connections, e.g., a hex and/or microwire tool. An exemplary connection may include 5/32" (4 mm) hex-sized.

Tool body 102 may include outer shell 104, distribution hub 118, and one or more radial walls 114. Radial walls 114 may extend longitudinally along and/or radially outward from all or any part of the tool body 102, form respective channels 116 therebetween, receive a wire between the outer shell 104 and distribution hub 118, and/or split the wire into wire strands via respective channels 116. Channels 116 may receive the wire at leading end 103, separate the wire into wire strands via nose 113, expand the wire strands wire radially outward along tool body 102, and output the wire strands at trailing end 105.

Referring again to FIGS. 1-7, tool body 102 may include leading end 103, trailing end 105, axis L (e.g., a rotational or longitudinal axis), and axis R (e.g., a transverse or radial axis from axis L). Tool body 102 may include outer shell 104 with outer edge 110 (e.g., a rounded tip), distribution hub 118 with inner edges 112a,b and nose 113 (e.g., angled, pointed, and/or star-structured tip), or a combination thereof.

As shown in FIGS. 3, 4, 5, 6, and 7, tool body 102 may be configured to receive and direct the wire at the leading end 103, separate the wire into respective wire strands via inner edges 112a,b and nose 113, radially expand the respective wire strands along channels 116 of the distribution hub 118, and discharge the separated wire strands at the trailing end 105, or vice versa. The tool body 102 may be configured to receive a wire at leading end 103 in a unitary configuration (e.g., twisted), separate and expand the wire into wire strands between the leading end 103 and the trailing end 105, and output the wire strands at trailing end 105 in a separated configuration (e.g., untwisted).

Body 102 may include outer shell 104 concentrically positioned along axis R and relative to distribution hub 118 along axis L. Tool body 102 may be configured to align axis L with a central axis of a wire such that leading end 103 is advanced along the central axis of the wire, separates the wire as it passes along axis L, expands the wire along axis R by channels 116, and provides the separated wire at the trailing end 105. The tool body 102 may be configured to adapt the wire between the unitary and separated configurations.

Tool body 102 may include one or more radial walls 114 forming respective channels 116 to separate the wire into respective strands. Channels 116 may be formed between outer shell 104, radial walls 114, and distribution hub 118. Radial walls 114 may extend longitudinally between leading end 103 and trailing end 105 and radially outward toward the outer shell 104. Radial walls 114 may be angled and/or twisted relative to axis L and/or axis R, e.g., to separate and expand the wire.

Radial walls 114 may be arranged to form one or a plurality of channels 116 between leading end 103 and trailing end 105. Radial walls 114 and/or channels 116 may extend all or any part of tool body 102. Tool body 102 may be configured to receive a wire between outer shell 104 and distribution hub 118. Nose 113, inner edges 112, and radial walls 114 may be configured to split the wire into respective channels 116 that expand radially outward to capture, direct and separate the wire into wire strands.

Tool body 102 may include nozzle 108 tapering radially outward between outer edge 110 and outer shell 104. Channels 116 may direct the wire between leading end 103 and trailing end 105, e.g., along axis L and outward relative to axis R. Tool body 102 may include one or a plurality of grooves 106 (e.g., any quantity such as six), which may be configured to further straighten the wire.

Figure 8:
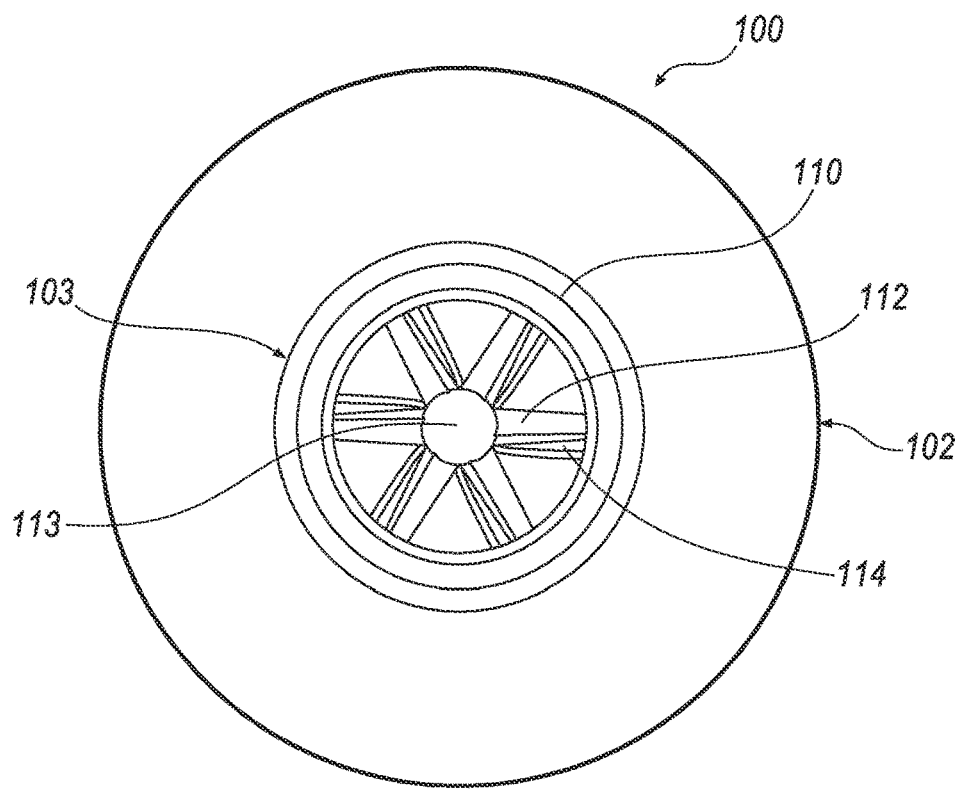
FIG. 8 illustrates a front view of an exemplary embodiment of the present disclosure including, e.g., a first leading end configuration.
Figure 9:
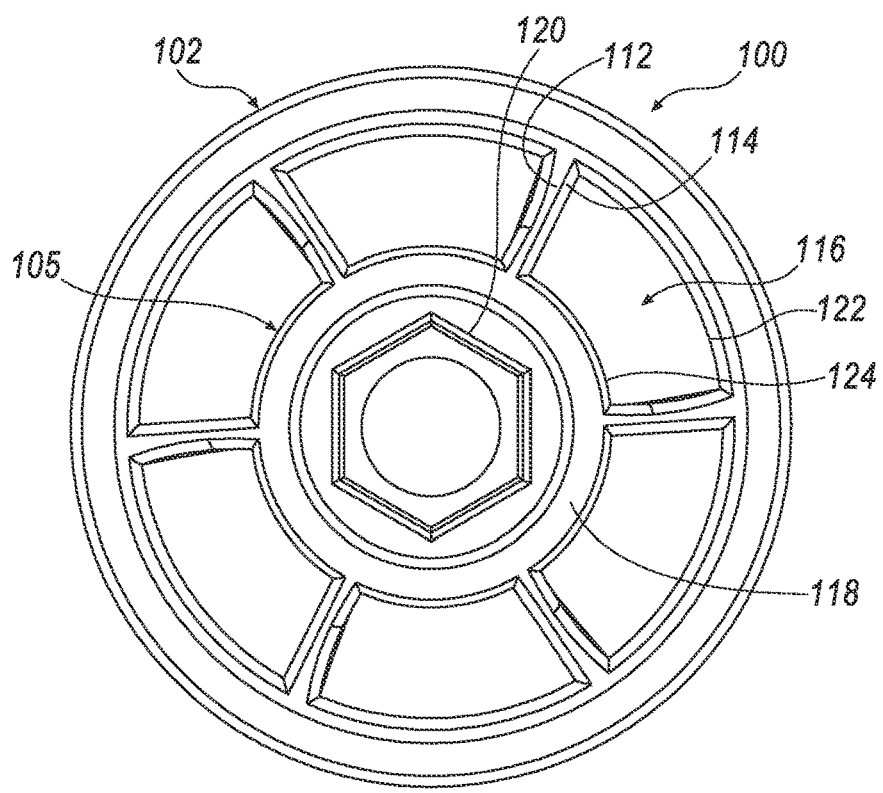
FIG. 9 illustrates a rear view of an exemplary embodiment of the present disclosure including, e.g., a first trailing end configuration.
Figure 10:
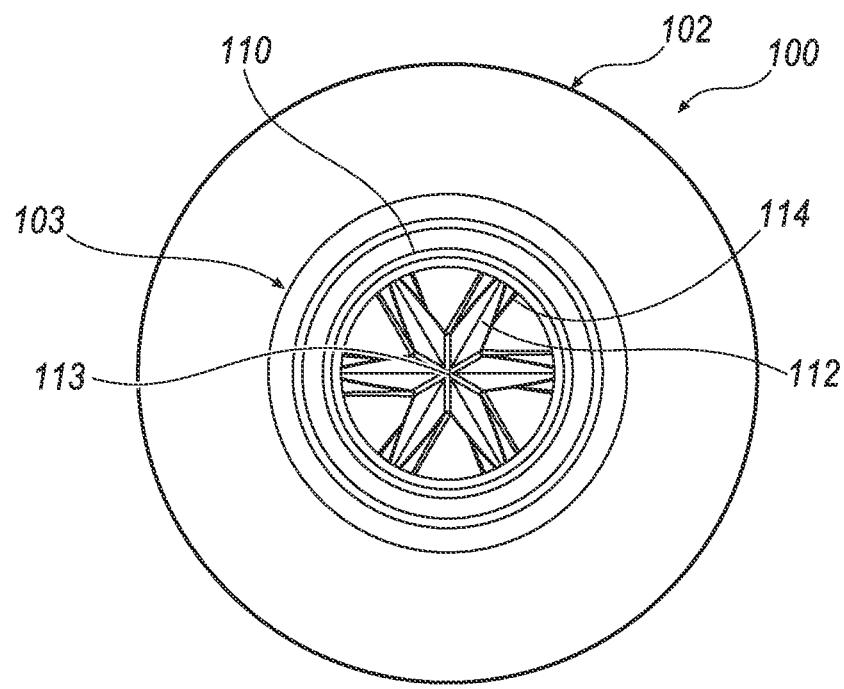
FIG. 10 illustrates a front view of an exemplary embodiment of the present disclosure including, e.g., a second leading end configuration.
Figure 11:
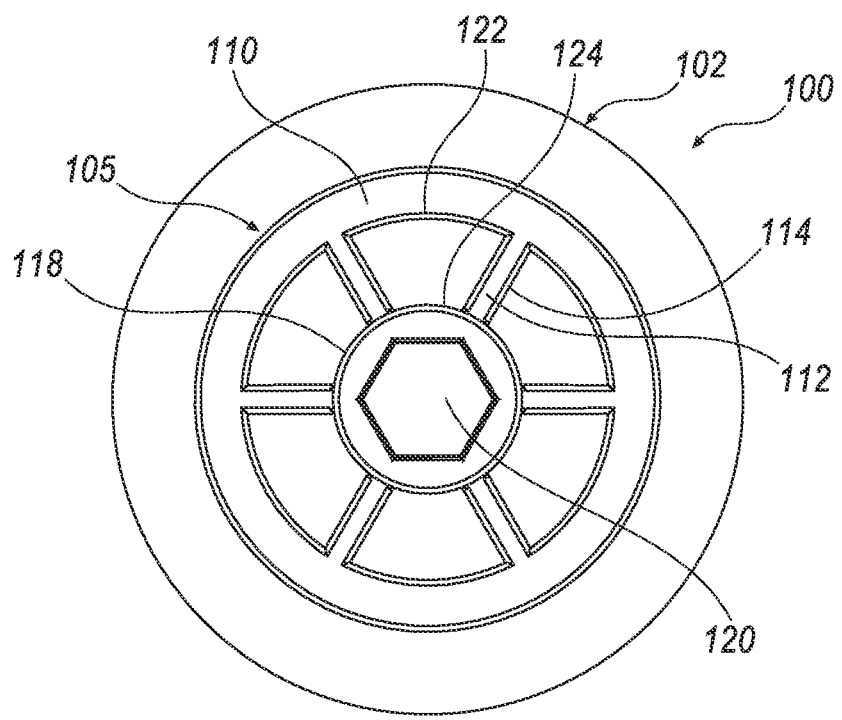
FIG. 11 illustrates a rear view of an exemplary embodiment of the present disclosure including, e.g., a second trailing end configuration.

FIGS. 8, 9, 10 and 11 illustrate exemplary configurations of leading and trailing ends 103, 105. As shown in FIGS. 8 and 10, leading end 103 may include outer edge 110, inner edges 112a,b, and radial walls 114. As shown in FIGS. 9 and 11, trailing end 105 may include outer wall 122 and inner wall 124. Outer edge 110, inner edges 112a,b, and radial wall 114 may form respective channels 116 (e.g., angled compartments) between leading end 103 and trailing end 105.

Channels 116 may be formed by outer wall 122, inner wall 124, and opposing radial walls 114. Outer edge 110, inner edges 112a,b, and radial wall 114 may include one or a plurality of angled, twisted, and/or curved surfaces relative to axis L and/or axis R, e.g., to direct the wire between the unitary and separated conditions. For example, tool body 102 may include leading end 103 with leading edge 112, nose 113 (e.g., an angled, pointed, and/or star-structured tip), radial walls 114, and channels 116 that are configured to separate the wire (e.g., twisted-pair wire) using the contact force and centrifugal force.

Figure 12:
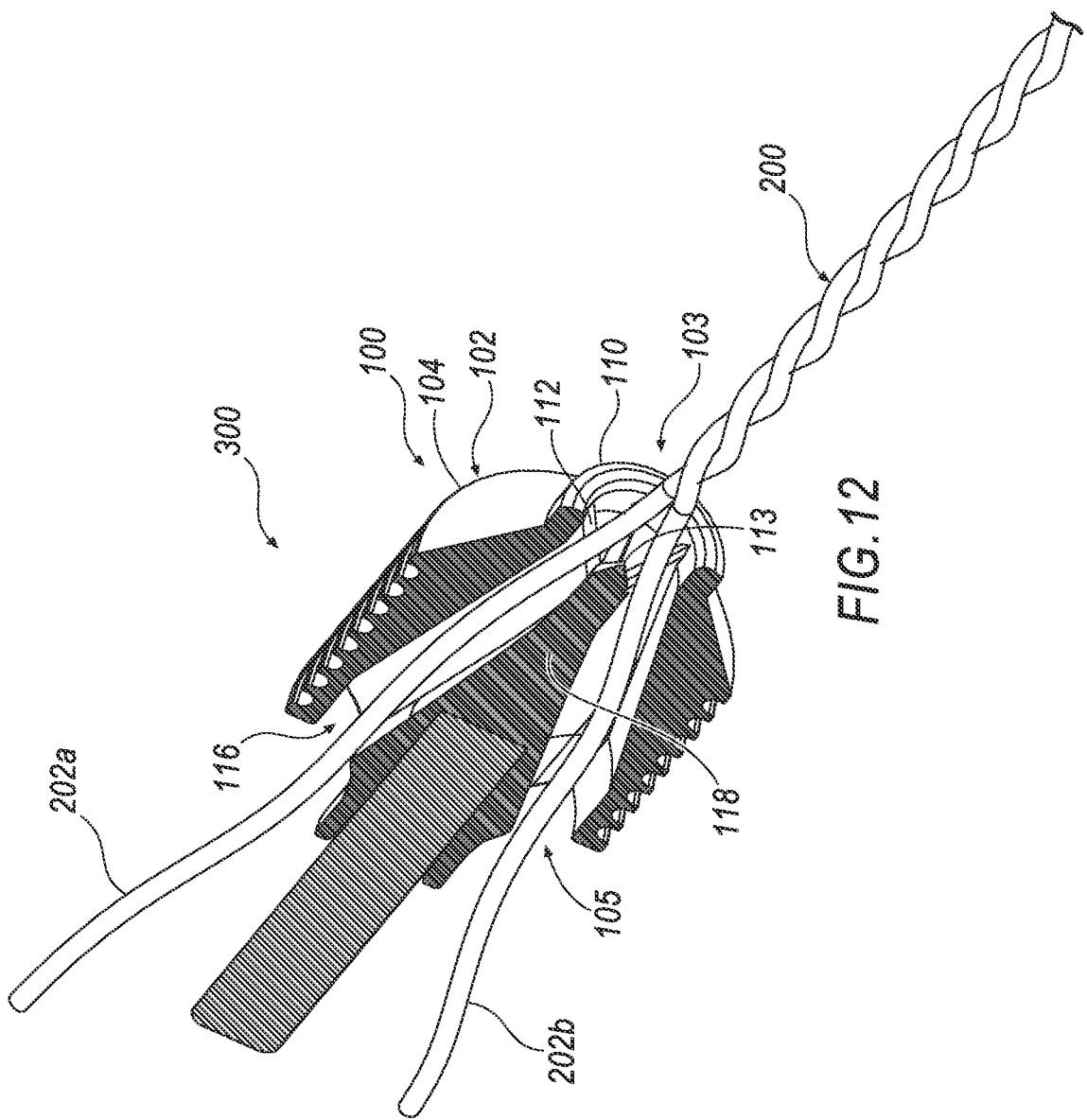
FIG. 12 illustrates a cross-section, isometric view of an exemplary embodiment of the present disclosure including, e.g., an untwist tool performing a wiring operation such as decoupling a wire into wire strands.

FIG. 12 illustrates an exemplary system 300 including, for example, tool 100 performing a wiring operation. Tool 100 may receive wire 200 between outer shell 104 and distribution hub 118. Tool 100 may split wire 200 into respective channels 116 that expand radially outward to capture and separate wire 200 into wire strands 202a,b corresponding to respective channels 116. Outer shell 104 may include outer edge 110 (e.g., a rounded tip). Distribution hub 118 may include one or more inner edges 112a,b and nose 113 (e.g., a pointed, angled, and/or star-structured tip). Tool 100 may be configured to receive and direct wire 200 at the leading end 103, separate wire 200 into respective wire strands 202a,b along distribution hub 118, and discharge wire strands 202a,b at trailing end 105.

FIGS. 13-14 illustrate an exemplary drive system 400, e.g., configured for powered wiring operations. System 400 may include tool 100 and drive device 402, e.g., modular or integral to each other. Drive device 402 may include control switch 404, battery 406, driver 408 (e.g., electric motor), power/charge receptacle 410, and power indicator 412. Receptacle 410 may receive power via an electrical charger or cord and transfer power to and store power in battery 406, which is operationally and electrically connected to driver 408. Driver 408 may be operatively connected to and apply a rotational and/or longitudinal force to tool 100, thereby rotating tool 100 by drive device 402 and causing tool 100 to twist and/or untwist a wire.

Figure 15:
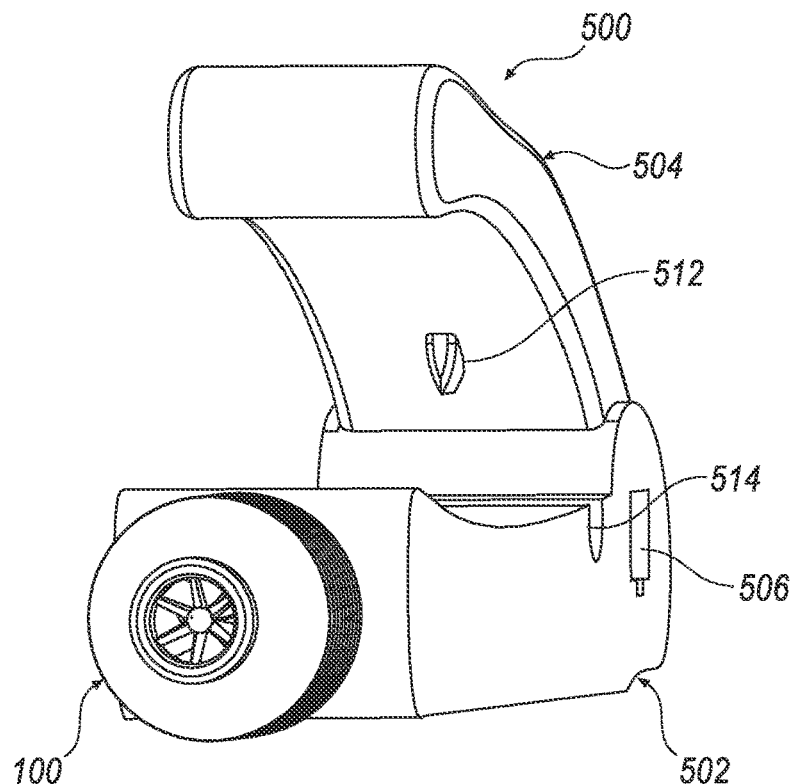
FIG. 15 illustrates an isometric view of an exemplary embodiment of the present disclosure, e.g., a combination system including a wire tool and a drive device for twisting, cutting, and/or crimping.
Figure 16:
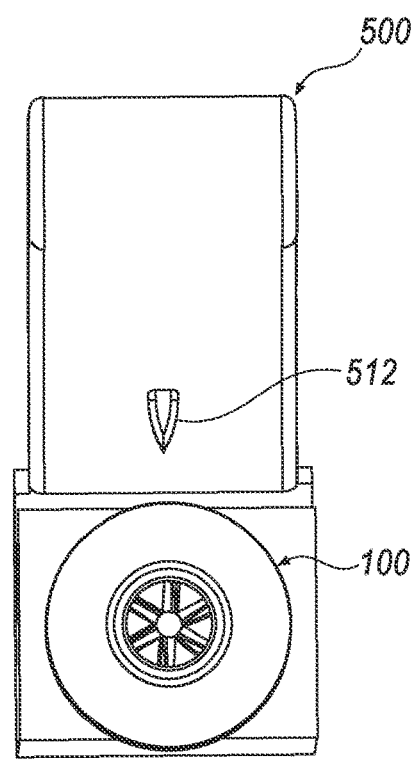
FIG. 16 illustrates a front view of FIG. 15.
Figure 17:
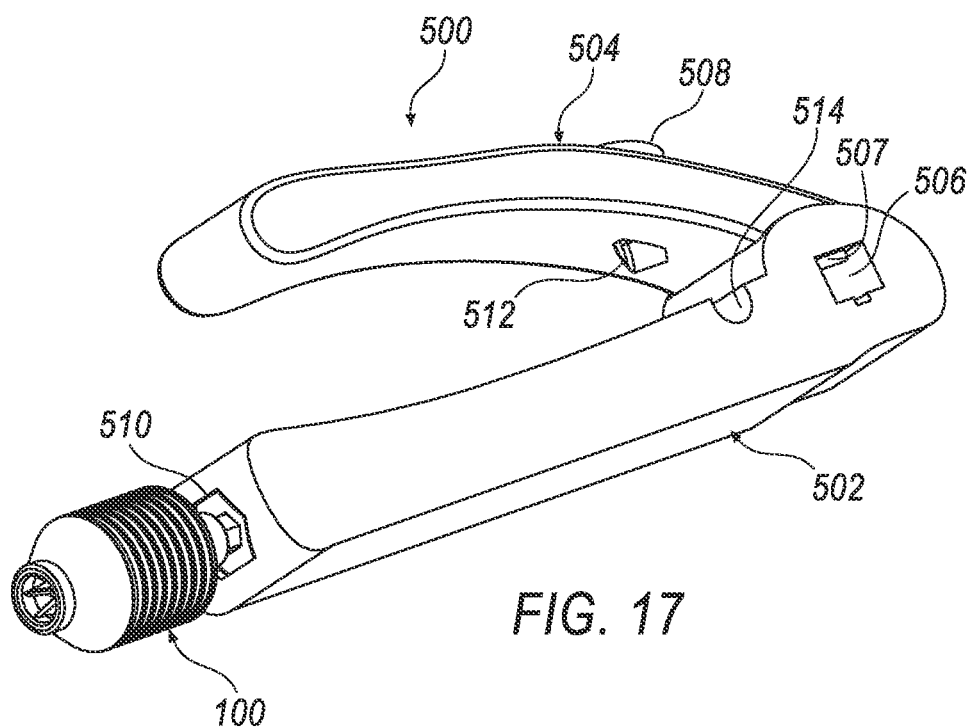
FIG. 17 illustrates another isometric view of FIG. 15.
Figure 18:
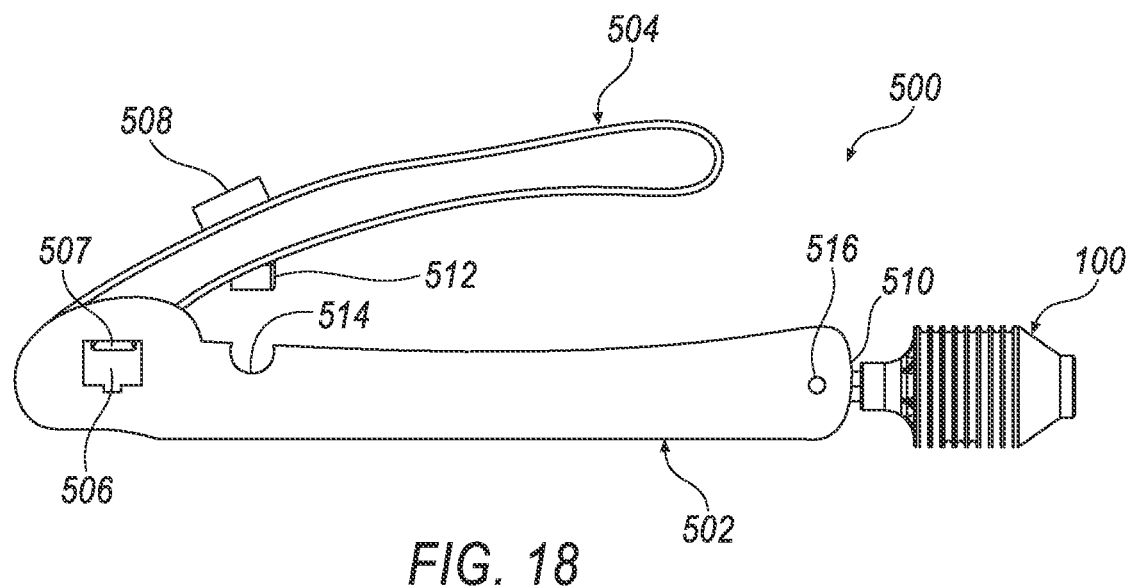
FIG. 18 illustrates a side view of FIG. 15.

FIGS. 15-20 illustrate multi-operation system 500, e.g., configured for simultaneous and/or sequential wiring operations as disclosed herein. As shown in FIGS. 15-16, system 500 may include tool 100 and drive device 502, e.g., modular or integral to each other. As shown in FIGS. 17-18, drive device 502 may include lever 504, crimp mechanism 506, actuator 508, driver 510 (e.g., gear drive), blade 512, cutting channel 514, release 516, and drive receptacle 518. Lever 504 may be operationally and mechanically connected to driver 510 by way of drive device 502. Driver 510 may be integral or modular with respect to the drive receptacle 518.

An exemplary system 500 may be configured for wiring operations such as twisting, untwisting, cutting, and/or connector crimping operations. Driver 510 may include a gear drive such as a worm gear connecting lever 504 and tool 100. A compressive force (e.g., grip force) on lever 504 relative to (e.g., toward) drive device 502 may move lever 504 inwards or toward drive device 502 to activate one or multiple wiring operations, and release of the compressive or grip force may move or reset handle 504 outwards or away from drive device 502 for one or more further wiring operations. Referring to FIGS. 15-17, a compressive force (e.g., grip force) on lever 504 may translate a rotational force on tool 100, thereby causing tool 100 to perform wiring operations (e.g., twisting and/or untwisting) on a wire.

Figure 19:
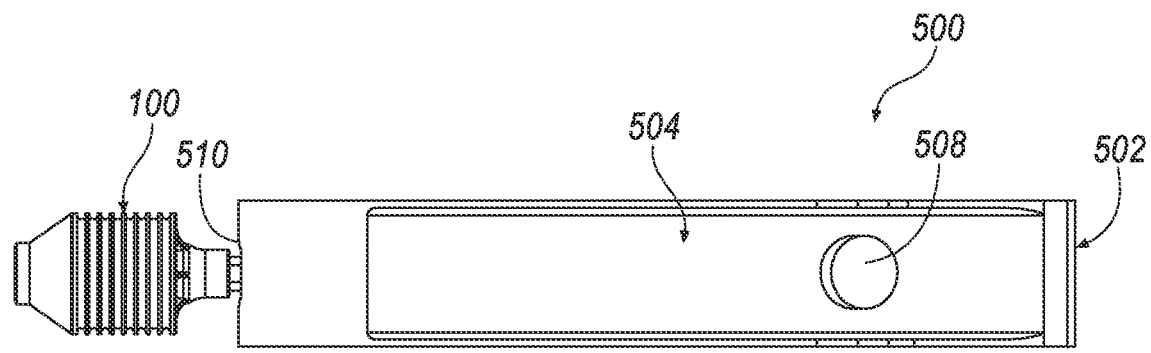
FIG. 19 illustrates a top view of FIG. 15.
Figure 20:
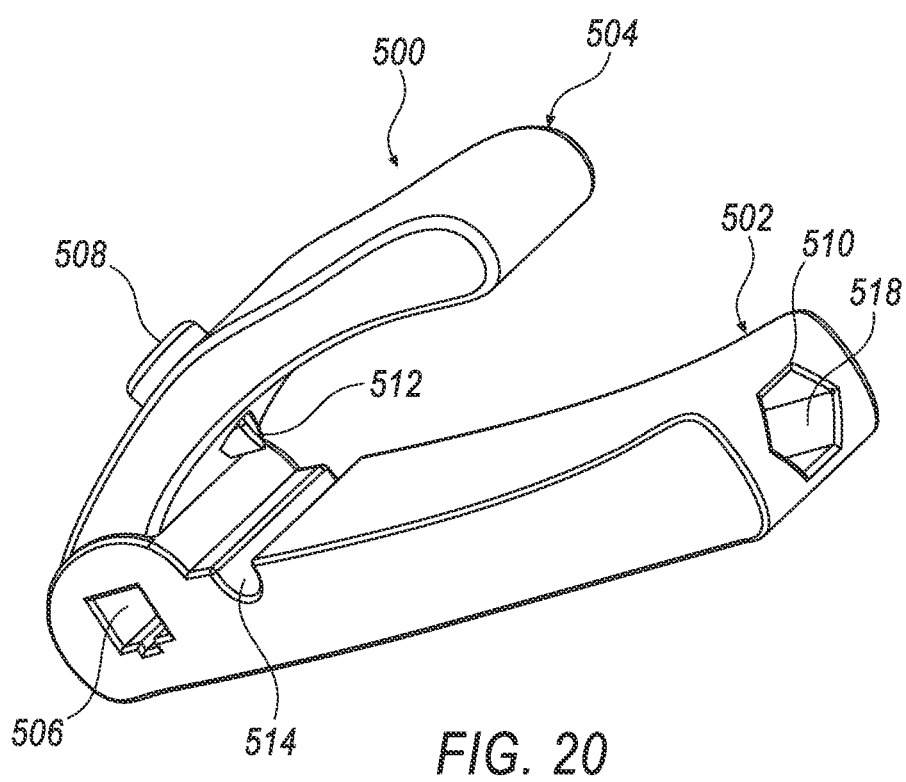
FIG. 20 illustrates an isometric view of an exemplary embodiment of the present disclosure, e.g., a combination device with a socket for receiving any type of bit.

System 500 may include variable cutting operations and depths depending on an applied force. With reference to FIGS. 18-19, lever 504 and/or actuator 508 may be spring-biased (e.g., spring-loaded) to an expanded condition and move to a retracted configuration depending on the location and magnitude of the applied force. Referring to FIG. 18, drive receptacle 518 may be configured to receive and apply a rotational force to one or a plurality of bit types.

In embodiments, system 500 may include first and second forces applied to lever 504 and/or actuator 508. Actuator 508 and/or cutting channel 514 may include blade 512. A wire having a jacket and/or sheath may be positioned in cutting channel 514. A first compressive force on lever 504 (e.g., grip force) and/or actuator 508 (e.g., thumb force) may move blade 512 to a sheath depth relative to cutting channel 514 (e.g., also having blade 512), thereby cutting a portion of a wire (e.g., jacket and/or sheath) positioned in cutting channel 514. A second compressive or grip force on lever 504 (e.g., grip force) and/or actuator 508 (e.g., thumb force) may move blade 512 to a wire termination depth, thereby cutting all or part of the remaining width of the wire positioned in cutting channel 514. Lever 504 may be configured to cut a portion of the wire (e.g., to a jacket and/or sheath depth), and actuator 508 may be configured to cut the remaining width of the wire (e.g., to a wire depth), or vice versa.

System 500 may be configured for wire operations such as connector coupling. A wire connector may be received in connector channel 506. A compressive or grip force on lever 504 may cause a crimping force by crimp mechanism 507, thereby crimping together a wire connector and a wire positioned in connector channel 506.

Any part of the systems, apparatuses, methods, and processes herein may occur in any arrangement, order, or sequence. Certain components or steps may occur simultaneously, others may be added, and/or others may be omitted. This disclosure illustrates certain embodiments and should in no way be construed to limit the claims.

The above description is illustrative and not restrictive. Many embodiments and applications, other than the examples provided, are apparent upon reading the above description. The scope should be determined, not with reference to the above description, but should instead be determined with reference to the claims, along with the full scope of equivalents to which such claims are entitled. Future developments will occur in the technologies discussed herein, and the disclosed systems and methods will be incorporated into such future embodiments. The embodiments of this disclosure are capable of modification, variation, and adaptation.

All terms used in the claims are intended to be given their broadest reasonable constructions and their ordinary meanings as understood by those knowledgeable in the technologies described herein unless an explicit indication to the contrary is made herein. Use of the singular articles such as "a," "the," "said," etc. should be read to recite one or more of the indicated elements unless a claim recites an explicit limitation to the contrary.

The Abstract of the Disclosure is provided to allow the reader to ascertain the nature of the technical disclosure, but it should not be used to interpret or limit the scope or meaning of the claims. Various features of this disclosure may be grouped in various embodiments to streamline the disclosure, but the claimed embodiments shall not be interpreted as requiring more features than are expressly recited in each claim. The inventive subject matter of the claims lies in less than all features of a single disclosed embodiment. The claims are hereby incorporated into the Detailed Description, with each claim standing on its own as a separately claimed subject matter.

What is claimed is:

1. A system for untwisting a wire, comprising:
   a wire tool including a tool body having a rotational axis, the tool body including
      an outer shell including an inner circumference,
      a distribution hub including an outer circumference,
      a plurality of radial walls extending between the outer circumference of the distribution hub and the inner circumference of the outer shell, and circumferentially spaced about the inner and outer circumferences, and
      respective channels formed by the inner circumference of the outer shell, the outer circumference of the distribution hub, and circumferentially adjacent walls of the plurality of radial walls,
      wherein the tool body is configured to split the wire into the respective channels, and the respective channels expand radially outward to separate the wire into wire strands corresponding to the respective channels; and
   a drive device operatively connected to the wire tool.

2. The system of claim 1, wherein the tool body is configured to receive the wire between the outer shell and distribution hub.

3. The system of claim 1, wherein the outer shell includes an outer edge and the plurality of radial walls each include an inner edge, and the outer edge includes a rounded tip and the inner edge includes a star-structured tip.

4. The system of claim 1, wherein the tool body is configured to apply a longitudinal force to feed the wire into the tool body, a rotational force to untwist and separate the wire into the wire strands along the respective channels, and a contact force to straighten the wire strands.

5. The system of claim 4, wherein the tool body is configured to apply a further rotational force to wrap the wire around grooves of the outer shell to further straighten the wire strands.

6. The system of claim 1, wherein the tool body includes a leading end and a trailing end and is configured to receive and direct the wire between the leading end and the trailing end.

7. The system of claim 1, wherein the tool body is configured to separate the wire into respective wire strands along the distribution hub.

8. A wire tool comprising:
   a tool body having a rotational axis, the tool body including
      an outer shell including an inner circumference,
      a distribution hub including an outer circumference,
      a plurality of radial walls extending between the outer circumference of the distribution hub and the inner circumference of the outer shell, and
      respective channels formed by the inner circumference of the outer shell, the outer circumference of the distribution hub, and circumferentially adjacent walls of the plurality of radial walls,
      wherein the tool body is configured to receive the wire between the outer shell and distribution hub and split the wire into the respective channels.

9. The wire tool of claim 8, further comprising a shaft configured to be positioned in the tool body and along the rotational axis.

10. The wire tool of claim 8, wherein the tool body is configured to apply a longitudinal force to feed the wire into the tool body, a rotational or centrifugal force to untwist and separate the wire into wire strands along the respective channels, and a contact force to straighten the wire strands.

11. The wire tool of claim 8, wherein the outer shell includes an outer edge and the plurality of radial walls each include an inner edge, and the outer edge includes a rounded tip and the inner edge includes a star-structured tip.

12. The wire tool of claim 10, wherein the tool body is configured to apply a further rotational force to wrap the wire strands around grooves of the outer shell to further straighten the wire strands.

13. The wire tool of claim 8, wherein the respective channels expand radially outward to separate the wire into wire strands corresponding to the respective channels.

14. The wire tool of claim 8, wherein the tool body includes a leading end and a trailing end and is configured to receive and direct the wire between the leading end and the trailing end and separate the wire into respective wire strands along the distribution hub.

15. A method of a wire tool, comprising:
providing a tool body having a rotational axis, wherein the tool body includes an outer shell having an inner circumference, a distribution hub having an outer circumference, a plurality of radial walls extending between the outer circumference of the distribution hub and the inner circumference of the outer shell, and respective channels formed by the inner circumference of the outer shell, the outer circumference of the distribution hub, and circumferentially adjacent walls of the plurality of radial walls;
providing a shaft configured to be positioned in the tool body and along the rotational axis; and
receiving a wire between the outer shell and distribution hub to split the wire into the respective channels, wherein the respective channels expand radially outward to separate the wire into wire strands corresponding the respective channels.

16. The method of claim 15, wherein the outer shell includes an outer edge and the plurality of radial walls each include an inner edge.

17. The method of claim 16, wherein the outer edge includes a rounded tip and the inner edge includes a star-structured tip.

18. The method of claim 15, further comprising applying a longitudinal force to feed the wire into the tool body, a rotational or centrifugal force to untwist and separate the wire into the wire strands along the respective channels, and a contact force to straighten the wire strands.

19. The method of claim 15, further comprising directing the wire between the leading end and the trailing end to separate the wire into the respective wire strands.

20. The method of claim 15, further comprising separating the wire into respective wire strands along the distribution hub.

* * * * *